May 21, 1946.  R. J. BROWN  2,400,738
TRAILER AND TRACTOR SAFETY LOCK
Filed June 14, 1944   2 Sheets-Sheet 1
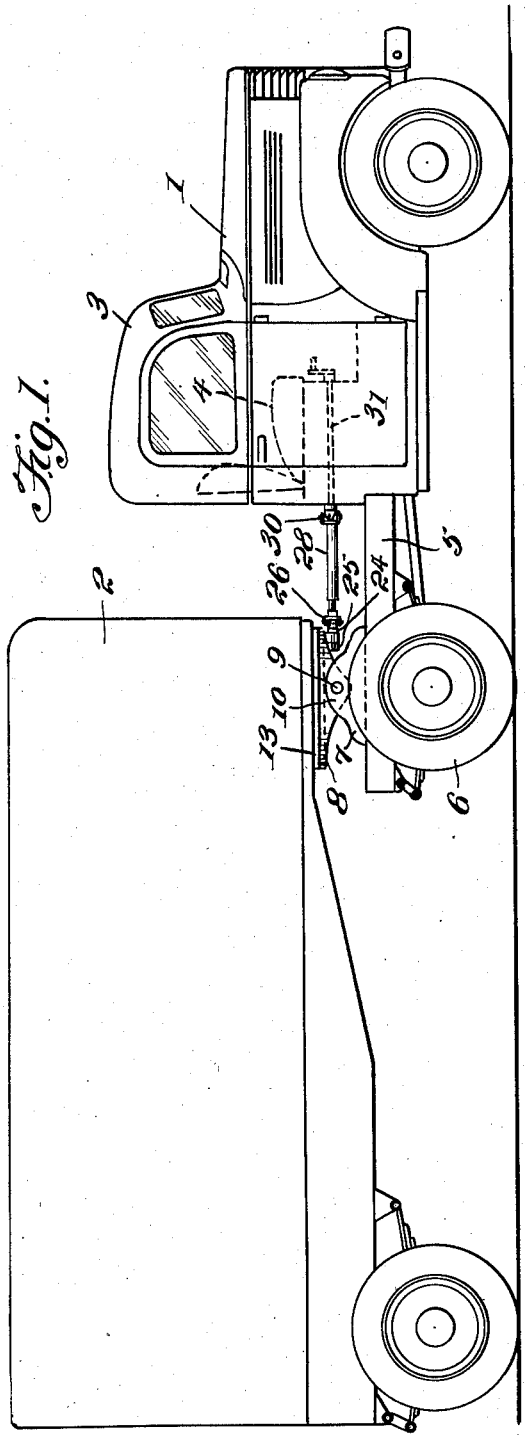
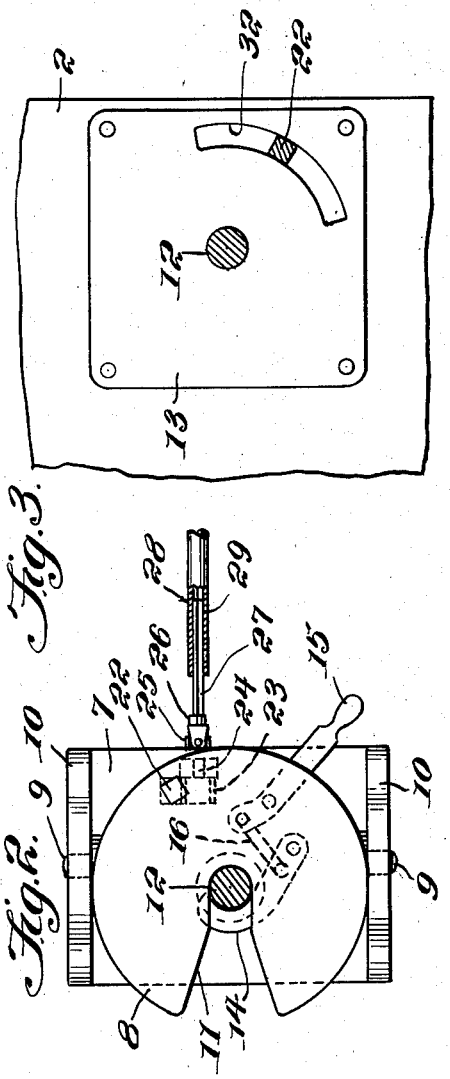
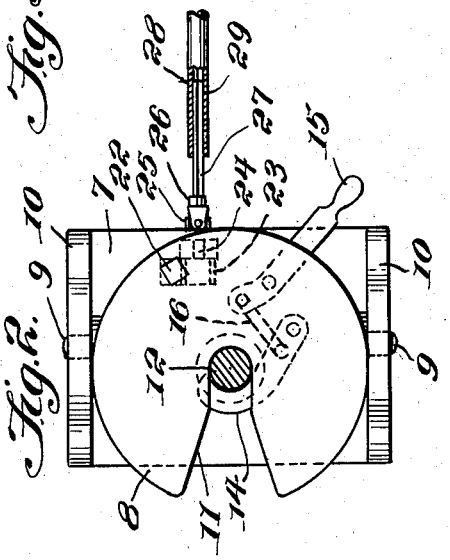
Roy J. Brown,
INVENTOR.
BY
Victor J. Evans & Co.
ATTORNEYS Roy J. Brown,
INVENTOR.

Patented May 21, 1946

2,400,738

UNITED STATES PATENT OFFICE 2,400,738

TRAILER AND TRACTOR SAFETY LOCK

Roy J. Brown, Sioux Falls, S. Dak.

Application June 14, 1944, Serial No. 540,334

3 Claims. (Cl. 280—33.1)

My present invention, in its broad aspect, has to do with improvements in means for preventing the turning of a tractor or other power vehicle at an excessive degree when running at high speed on the road, thereby eliminating the possibility of "jack-knifing" or the development of an excessive angle between the trailer and the powered vehicle with consequent loss of control. Ordinarily, the only way the driver can regain control of the tractor or powered vehicle and the trailer under the foregoing conditions is for the driver to speed-up the tractor. My invention, on the other hand, positively eliminates turning at excessive degrees and "jack-knifing," except that in parking and the like, the tractor or powered vehicle can be turned at any angle to the trailer or vice-versa.

Other and equally important objects and advantages of my invention are: (1) the provision of an arcuate slot in the face plate of a trailer carrying the bolster or king pin, wherein the length of the slot measured in degrees of a circle determines the outside limit of the angle of turning of the trailer, (2) the provision of a locking pin carried by the fifth wheel, and moreover, to extend therethrough to enter the degree slot so that the angularity (or turning angle) between the tractor and trailer is positively limited by restricting the movement of the face plate with respect to the fifth wheel, (3) the provision of an operating shaft from the driver's seat to the fifth wheel and locking pin assembly which is formed with telescoping sections joined to permit movement of the sections of the shaft longitudinally with respect to each other, but not rotationally, and the provision of universal joints in said shaft, so that tilting of the fifth wheel when the trailer is not connected is permitted, (4) the provision of unique means for actuating the locking pin, and (5) the provision of a device which is simple in construction and operation and has no fragile parts likely to become broken or out of order.

Other equally important objects and advantages will be apparent from the following description taken in connection with the accompanying drawings:

Figure 1 is a side view of a tractor, or powered vehicle and a trailer, with my invention applied;

Figure 2 is a detail plan view of the fifth wheel, and king or bolster pin locking device, and shows a portion of my invention;

Figure 3 is a detail plan view of the face plate of the trailer, with the degree slot, and locking pin;

In the drawings wherein like characters of reference are used to designate like or similar parts throughout the several views:

Figure 4:
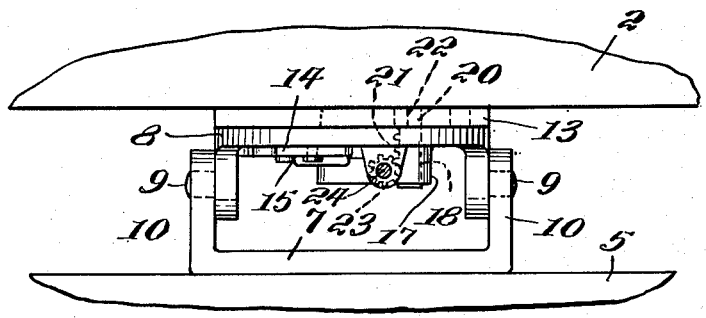
Figure 4 is an end view of the face plate and fifth wheel, and shows my device in operation.

The numeral 1 designates a tractor or other powered vehicle, and 2 a trailer. The tractor has the usual cab 3 and driver's seat 4, chassis 5 and rear wheels 6. On the chassis above the rear wheels is mounted the support 7 for the fifth wheel 8, the fifth wheel being pivotally supported as at 9 to the spaced flanges 10 of the support 7 to tilt back when the trailer is not attached to facilitate coupling of the trailer and tractor. The fifth wheel has a flared slot 11 for receiving the bolster pin or king pin 12 of the trailer face plate 13. A pivoted locking arm 14 beneath the fifth wheel, and operating lever 15 and link 16 is provided to move the arm 14 to engage about the king pin 12 to hold the trailer securely and properly coupled with the tractor.

Figure 5:
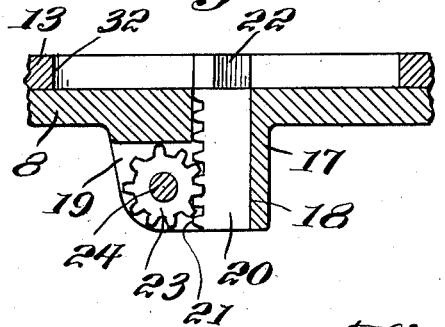
Figure 5 is a sectional detail of my locking pin and actuating mechanism with the locking pin engaged in the degree slot.
Figure 6:
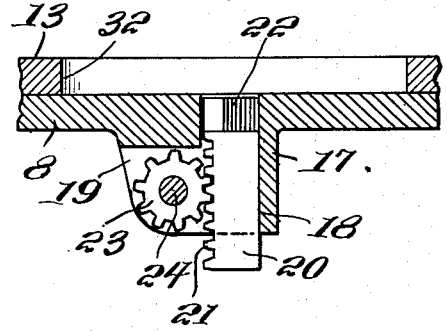
Figure 6 is a sectional detail similar to Figure 5, and shows the locking pin withdrawn from the degree slot.
Figure 7:
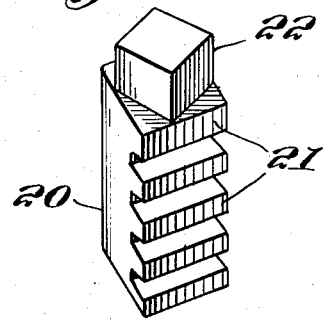
Figure 7 is a perspective view of the locking pin and toothed shank.

Referring to Figures 5 and 6, the fifth wheel 8 has formed therebeneath adjacent its periphery and toward but to one side of the leading edge thereof an enlargement 17 formed with a square vertical opening 18 extending through the fifth wheel, and communicating with a slot 19. An elongated square pin 20 having a toothed side 21 or rack is slidably mounted in the opening 18, and has a square head 22 the faces of which are angularly disposed with respect to the faces of the pin as shown in Figure 7. Pivotally mounted in the slot 19 is a pinion 23 the teeth of which are intermeshed with the teeth 21 or rack in the side of the pin 19, and coupled or formed on the shaft 24 of the pinion 23 is a bifurcated coupling element 25. The pinion 23 is keyed or rigidly fixed on the shaft 24 to turn therewith. The element 25 is one unit of a universal coupling 26 on the squared section 27 of a shaft 28, the other section 29 of which is hollow and internally squared to receive the section 27 in telescoping relationship to permit longitudinal adjustment. The shaft 28 extends forward to the rear of the driver's seat and is joined by a universal coupling 30 to the hand crank 31 in reach of the driver as shown in Figure 1. Therefore, the driver may turn crank 31 to rotate shaft 28 and pinion 23 to feed the pin 20 up and down, as shown in Figures 5 and 6. Registering with the squared head 22 of pin 20 is an arcuate slot 32 in the face plate 13 of the trailer; the length of the slot being determined in degrees commensurate with the determined limit which the tractor may safely take to the trailer without "jack-knifing." When the head 22 of pin 20 is withdrawn from slot 32 as in Figure 6, the tractor and trailer may be turned at any angle, but when the head 22 of pin 20 is fed up into the slot 32 as in Figure 5, the limit of such angle is determined by the length of the slot with the result that possible "jack-knifing" is prevented.

It is believed that the operation and advantages of my invention will be apparent from the foregoing, and in connection with my invention it is pointed out that change in size, shape, proportion and arrangement of parts may be made provided they fall within my broad inventive concept and are within the purview of what is claimed.

I claim:

1. In combination with the fifth wheel of a tractor, and the face plate of a trailer, the face plate of the trailer having an arcuate slot therein said fifth wheel having an enlarged portion formed therebeneath adjacent its periphery, a square vertical opening therein, a slot communicating with said opening, a square pin mounted in the enlarged portion formed on the fifth wheel for vertical sliding movement, a toothed portion on said pin, a square head on said pin the faces of which are angularly disposed with respect to the faces of the pin, a pinion positioned in the slot formed in the enlarged portion of said fifth wheel engaging said toothed portion, and means actuating said pinion to raise and lower the pin, said pin in its raised position having the head thereof conforming with and engaging in the slot in the face plate to limit the angular movement of the trailer with respect to the tractor.

2. In combination with the fifth wheel of a tractor, and the face plate of a trailer, the face plate of the trailer having an arcuate slot therein said fifth wheel having an enlarged portion formed integral with and adjacent to the periphery of said wheel, a square vertical opening in said portion, a slot communicating with said opening, a square pin mounted in the enlarged portion formed on the fifth wheel for vertical sliding movement, said pin having teeth forming a rack in one side thereof and a square head formed thereon having the faces thereof angularly disposed with respect to the faces of the pin, a pinion positioned in the slot formed in the enlarged portion of said fifth wheel engaging the teeth, a shaft coupled with the pinion, said shaft being longitudinally extensible, a hand crank connected with said shaft, and universal joints between the crank and the shaft, and between the shaft and the pinion, said pin being movable vertically to have the square head thereof engage in and conform to the edges of the arcuate slot to limit the angular movement of the trailer with respect to the tractor.

3. In combination with the fifth wheel of a tractor, and the face plate of a trailer, the face plate of the trailer having an arcuate slot therein, an elongated square pin having a square head formed thereon with the faces of said pin angularly disposed with respect to the faces of the pin mounted on the fifth wheel for vertical sliding movement, said pin having teeth forming a rack in one side thereof, a pinion engaging the teeth, a support comprising an enlarged portion formed integral with the fifth wheel having a square vertical opening therein for the pin and a slot communicating with said opening for the pinion, a sectional shaft coupled with the pinion, the sections of which are formed for independent longitudinal movement with respect to each other, but locked against independent rotational movement, a hand crank, and universal joints between the crank and the shaft and between the shaft and the pinion, said pin being movable vertically to the square head thereof engage in and conform to the edges of the arcuate slot to limit the angular movement of the trailer with respect to the tractor.

ROY J. BROWN.